MEANDER-TYPE WAVE DELAY LINES

Filed Sept. 17, 1965

INVENTOR
W. SOBOTKA

BY

ATTORNEY 3,484,725
MEANDER-TYPE WAVE DELAY LINES
Walter Sobotka, Paris, France, assignor to CSF-Compagnie Generale de Telegraphie Sans Fil, a corporation of France
Filed Sept. 17, 1965, Ser. No. 487,976
Claims priority, application France, Oct. 5, 1964, 990,323
Int. Cl. H03h 7/30
U.S. Cl. 333—31 9 Claims

ABSTRACT OF THE DISCLOSURE

A meander-type wave delay line in which, in order to increase the capacity between the neighboring conductors, said conductors are provided with terminal portions thicker than the central portions thereof.

The present invention relates to wave delay lines for use in travelling wave tubes and more particularly to lines of "meander" type, also known as "folded lines" or "snake lines."

A meander type wave delay line is composed, as known, of a series of parallel, identical and equidistant conductors, each of which has its two extremities connected to the preceding and the following conductor, respectively.

The use of the meander line is particularly advantageous is crossed-field amplifier tubes. This line has, indeed, a normal (direct) dispersion on the fundamental space component, and its pass-band is infinite on the side of the longer wavelengths. The structure of this line is robust and, when provided with a cooling system, it may receive without any damage the impact of intense electron beams which permits the realization of a high power output.

However, when designing meander-type lines for centimeter wavelengths, certain difficulties are encountered: the pitch of the line must be small to insure a high delay ratio whereas the distance between conductors must, on the contrary, be large if a low dispersion is desired. The performances of the meander line in its present form are unable, in a number of cases, to satisfy the above contradictory requirements.

The present invention has for its object improved meander line structures that make it possible to appreciably ameliorate the performances of these lines.

In accordance with the present invention a wave delay line comprising meander-folded conductors, fixed on a dielectric plate which in turn is fixed to a metal back-plate, is characterized in that the capacity between conductors is made higher in the terminal regions of the conductors than in the central region thereof by one of the following dispositions or any combination thereof: (a) the terminal portions of the conductors are thicker than the central portions, (b) the terminal portions of the conductors are covered with dielectric bars, (c) the dielectric plate, disposed between the conductors and the back-plate, extends only opposite the central portion of the conductors, and the width of the dielectric plate is less than the length of the conductors.

A meander line modified in this manner presents, for a given range of delay ratios, a reduced dispersion, that is a broader pass-band than that obtained with the same line prior to the modification according to the present invention.

The invention will be more clearly understood from the following description of the accompanying drawings, FIG. 1 represents a plan view of a meander-type wave delay line as known in the prior art.

Figure 1:
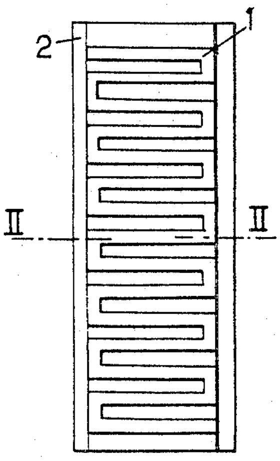
Figure 2:
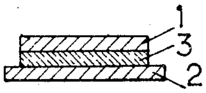
FIG. 2 is a section along line II—II of FIG. 1.

Referring to FIGURES 1 and 2, representing a meander-type wave delay line in plan view and in cross-section, respectively, it is seen that the line is composed of metal bars 1, fixed to a metal back-plate 2, while a dielectric plate 3 is interposed between the bars and the back-plate.

Figures 7, 8:
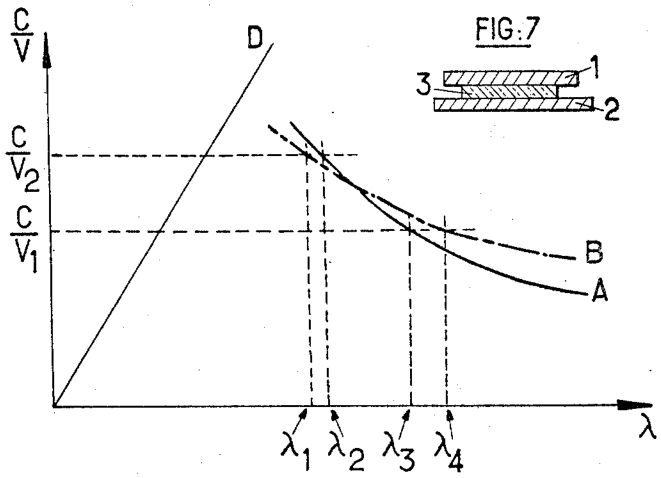
FIG. 7 shows in section still another embodiment of the present invention.
FIG. 8 is a diagram of the dispersion curves useful for explaining the instant invention.

The dispersion characteristic of this line is represented by the curve A (in full lines) of FIG. 8, where the abscissae represent the wavelengths $\lambda$ and the ordinates the delay ratio $c/v$, $c$ being the velocity of light and $v$ the phase velocity of the electromagnetic waves which can propagate along the line. The pass-band for this line, for the range of delay ratios from $c/v_2$ to $c/v_1$ extends from $\lambda_2$–$\lambda_3$.

Figure 3:
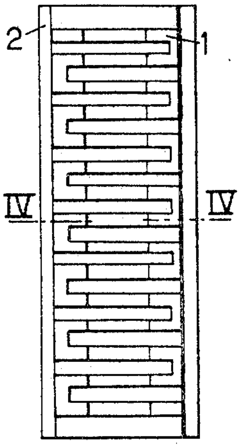
FIG. 3 represents in a plan view a delay line in accordance with the present invention.
Figure 4:
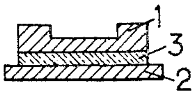
FIG. 4 is a section along the line IV—IV of FIG. 3.

FIGURES 3 and 4, in which similar reference numerals are used to designate corresponding parts of FIGURES 1 and 2, illustrate one embodiment of meander type delay line in accordance with the present invention, in which the metal bars 1 are increased in thickness in the terminal portions 1' thereof. Otherwise, the delay line of FIGURES 3 and 4 is similar to that of FIGURES 1 and 2.

The dispersion characteristic of the delay line of FIGURES 3 and 4 is represented by curve B (dash and dot line) of FIG. 8. Again the same range of delay ratios $c/v_2$ to $c/v_1$ as in connection with the line of FIGURES 1 and 2 is considered insofar as its pass-band is concerned.

It can be seen from FIG. 8 that the delay ratios comprised between $c/v_1$ and $c/v_2$ intercept on the curve B the wavelengths comprised between $\lambda_1$ and $\lambda_4$; the pass-band ($\lambda_1$—$\lambda_4$) obtained with curve B is consequently broader than with the curve A (band $\lambda_2$—$\lambda_3$).

The increase of the thickness in the terminal portions of the bars thus provides a means for obtaining an increase of the pass-band (decrease of the dispersion) without reducing the delay ratio and without any modification of the other dimensions or parameters of the line.

Figure 5:
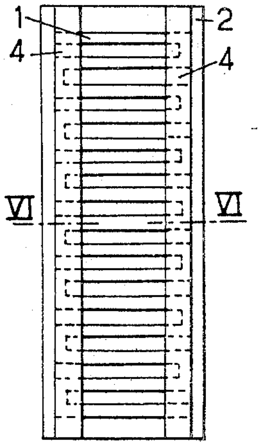
FIG. 5 represents another embodiment of a delay line in accordance with the present invention.
Figure 6:
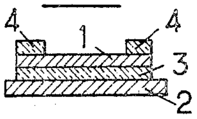
FIG. 6 is a section along the line VI—VI of FIG. 5.

Another embodiment of the present invention is represented in FIGURES 5 and 6, FIG. 6 being a section along the line VI—VI of FIG. 5.

In this embodiment the thickness of the bars 1 is uniform over the entire length thereof, like in the conventional line of FIG. 2, but the terminal portions of the metal bars 1 are covered with dielectric bars 4.

Finally, in the embodiment shown in section in FIG. 7 the metal bars 1 and the back-plate 2 are exactly the same as in the conventional line represented in FIGURES 1 and 2, but the dielectric plate 3 is of lesser width in this embodiment so that the dielectric 3 faces only the central portion of the bars 1, no dielectric being interposed between the back-plate 2 and the terminal portions of the bars 1.

The dispersion characteristics obtained with the embodiments of FIGURES 6 and 7 are again the same as the one represented by the curve B of FIG. 8.

The modifications of the dispersion characteristic are due in the three cases to the increase of the capacity between the conductor bars 1 in the terminal portions thereof. These results, verified experimentally, may also be justified by calculation.

In an example of realization it was found that a conventional meander line, composed of conductors 14 mm. long with a cross-section of 0.5 mm. x 0.2 mm., disposed with a pitch of 1 mm. on a dielectric plate 0.5 mm. thick, provides delay ratios comprised between 18 and 21 over a range of wavelengths from 8 to 14 cm.

Modified in accordance with FIGURES 3 and 4 of the present specification, the line exhibits, on the same band of 8 to 14 cm., delay ratios increased by about 15% with respect to those of the conventional line.

With the modification according to the FIGURES 5 and 6, the increase of the delay ratio was found to be about 20%.

While I have shown and described several embodiments in accordance with the present invention, it is understood that the same is not limited thereto but may be varied in numerous ways as known to a person skilled in the art. For example, the means for increasing the capacity of FIGURES 1 and 2, of FIGURES 1 and 3, of FIGURES 2 and 3 or of FIGURES 1, 2 and 3 may be combined to realize a desired increase. Thus it is obvious that the present invention is not limited to the details shown and described herein but is susceptible of numerous changes without departing from the spirit and scope thereof, and I therefore do not wish to be limited to these details but intend to cover all such changes and modifications as are encompassed by the scope of the appended claims.

I claim:

1. A meander-type wave delay line comprising a metal back-plate, a dielectric plate fixed on said back-plate, and meander-folded conductors fixed on said dielectric plate, the whole of the line conductor being a continuous structure said delay line having terminal folded portions and straight central portions, said folded portions having in the direction perpendicular to said plate, a thickness different from the thickness of said straight central portions thereof.

2. A meander-type wave delay line comprising a metal back-plate, a dielectric plate fixed on said back-plate, meander-folded conductors fixed on said dielectric plate, the whole of the line conductor being a continuous structure said delay line having terminal folded portions and straight central portions and dielectric bars covering the terminal folded portions of said conductors.

3. A meander-type wave delay line as claimed in claim 1, the width of said dielectric plate being less than the length of said conductors, whereby said dielectric plate extends only opposite the straight central portion of said conductors.

4. In a meander-type wave delay line as claimed in claim 1, the improvement consisting in the provision of means for increasing the capacity between said conductors in the terminal folded portions thereof with respect to the capacity between the same conductors in the straight central portions thereof.

5. A meander-type wave delay line as claimed in claim 1, means being provided on said conductors increasing the thickness of the terminal folded portions with respect to the straight central portions thereof to thereby increase the capacity between said conductors in the terminal folded portions thereof.

6. A meander-type wave delay line as defined in claim 1 wherein said means consists of a conductive extension of said conductors in the terminal folded portions thereof.

7. A meander-type wave delay line comprising a metal back-plate, a dielectric plate fixed on said back-plate, meander-folded conductors fixed on said dielectric plate, the whole of the line conductor being a continuous structure said delay line having terminal folded portions and straight central portions and dielectric members positioned over the terminal folded portions of the conductors.

8. A meander-type wave delay line as defined in claim 1 wherein said means consists of a conductive member positioned over the terminal folded portions of the conductors.

9. A meander-type wave delay line comprising a metal back-plate, a combination fixed on said back-plate including a dielectric plate and a meander-folded conductor having terminal folded portions and straight central portions, the thickness of said combination being different in the areas including said terminal folded portions than in the areas including said straight central portions so as to provide an increased electrical capacity in the areas of said terminal folded portions.

References Cited

UNITED STATES PATENTS

| | | | |
|---|---|---|---|
| 2,888,595 | 5/1959 | Warnecke | 315—3.5 |
| 3,139,597 | 6/1964 | French et al. | |
| 3,254,262 | 5/1966 | Hull | 315—3.5 |
| 2,999,182 | 5/1961 | Field | 315—3.6 |
| 3,164,790 | 1/1965 | Oh | 333—10 |
| 3,173,111 | 3/1965 | Kallman | 333—31 |
| 3,181,090 | 4/1965 | Ash. | |
| 3,327,255 | 6/1967 | Bolljahn et al. | 333—31 |
| 3,387,234 | 6/1968 | Sobotka | 333—31 |

HERMAN KARL SAALBACH, Primary Examiner

C. BARAFF, Assistant Examiner